United States Patent
Bugenhagen (10) Patent No.: US 7,646,720 B1
(45) Date of Patent: Jan. 12, 2010

(54) REMOTE SERVICE TESTING SYSTEM

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 708 days.

(21) Appl. No.: 10/959,546

(22) Filed: Oct. 6, 2004

(51) Int. Cl.
H04J 1/16 (2006.01)

(52) U.S. Cl. ............................... 370/241; 370/537

(58) Field of Classification Search .............. 370/241, 370/242, 243, 244, 245, 248, 249, 251, 252, 370/537
See application file for complete search history.

(56) References Cited

U.S. PATENT DOCUMENTS

| | | | |
|---|---|---|---|
| 5,648,965 A | | 7/1997 | Thadani et al. |
| 6,061,332 A | * | 5/2000 | Branton et al. ............... 370/241 |
| 6,137,782 A | * | 10/2000 | Sharon et al. ............... 370/255 |
| 6,380,971 B1 | * | 4/2002 | Brodigan ..................... 348/180 |
| 6,621,793 B2 | | 9/2003 | Widegen et al. |
| 6,756,898 B2 | * | 6/2004 | Ikematsu ..................... 340/531 |
| 6,958,977 B1 | | 10/2005 | Mitrani et al. |
| 2002/0131369 A1 | * | 9/2002 | Hasegawa et al. ........... 370/241 |
| 2003/0058106 A1 | * | 3/2003 | Ikematsu ................ 340/568.1 |
| 2003/0117959 A1 | * | 6/2003 | Taranov ..................... 370/241 |
| 2004/0184410 A1 | * | 9/2004 | Park ........................... 370/250 |
| 2005/0025063 A1 | * | 2/2005 | Grovenburg ................ 370/252 |
| 2005/0220153 A1 | * | 10/2005 | Harada ....................... 370/537 |

OTHER PUBLICATIONS

Hussain Qureshi et al., "Generic Framing Procedure", ITU-T G.7041; Jul. 23, 2002; 12 Pages; Agilent Technologies White Paper.

* cited by examiner

Primary Examiner—Ricky Ngo
Assistant Examiner—Kan Yuen (57) ABSTRACT

A remote service testing system comprising a service analyzer within an access network, a first enterprise network having a first plurality of nodes, and a first network extension coupled to the first enterprise network and the service analyzer. The service analyzer accesses the first enterprise network over the first network extension and performs test functions on the first plurality of nodes.

12 Claims, 6 Drawing Sheets

REMOTE SERVICE TESTING SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to packet networks, and in particular, to a remote service testing system for monitoring the performance of packet networks.

2. Description of the Prior Art

Current packet networks support multiple types of communication services, such as voice, video, and data service. Voice over Internet Protocol (VoIP) calling is an example of a voice service that is growing rapidly in popularity. As communication services have advanced, the problems associated with providing such services over packet networks have expanded. For example, VoIP service is notoriously unreliable due to the distributed nature of packet networks. Another problem involves the difficulty of analyzing service performance across a modern distributed packet network.

One prior art solution for analyzing service performance requires placing a local probe on a network to monitor the activities of various nodes on the network. Packet sniffers are an example of a local probe used to monitor a network. Probes can be used to isolate network elements and investigate their real-time behavior. Unfortunately, a local access point for the probe is required because most routers and firewalls would otherwise block the probe from monitoring network activity.

Figure 1:
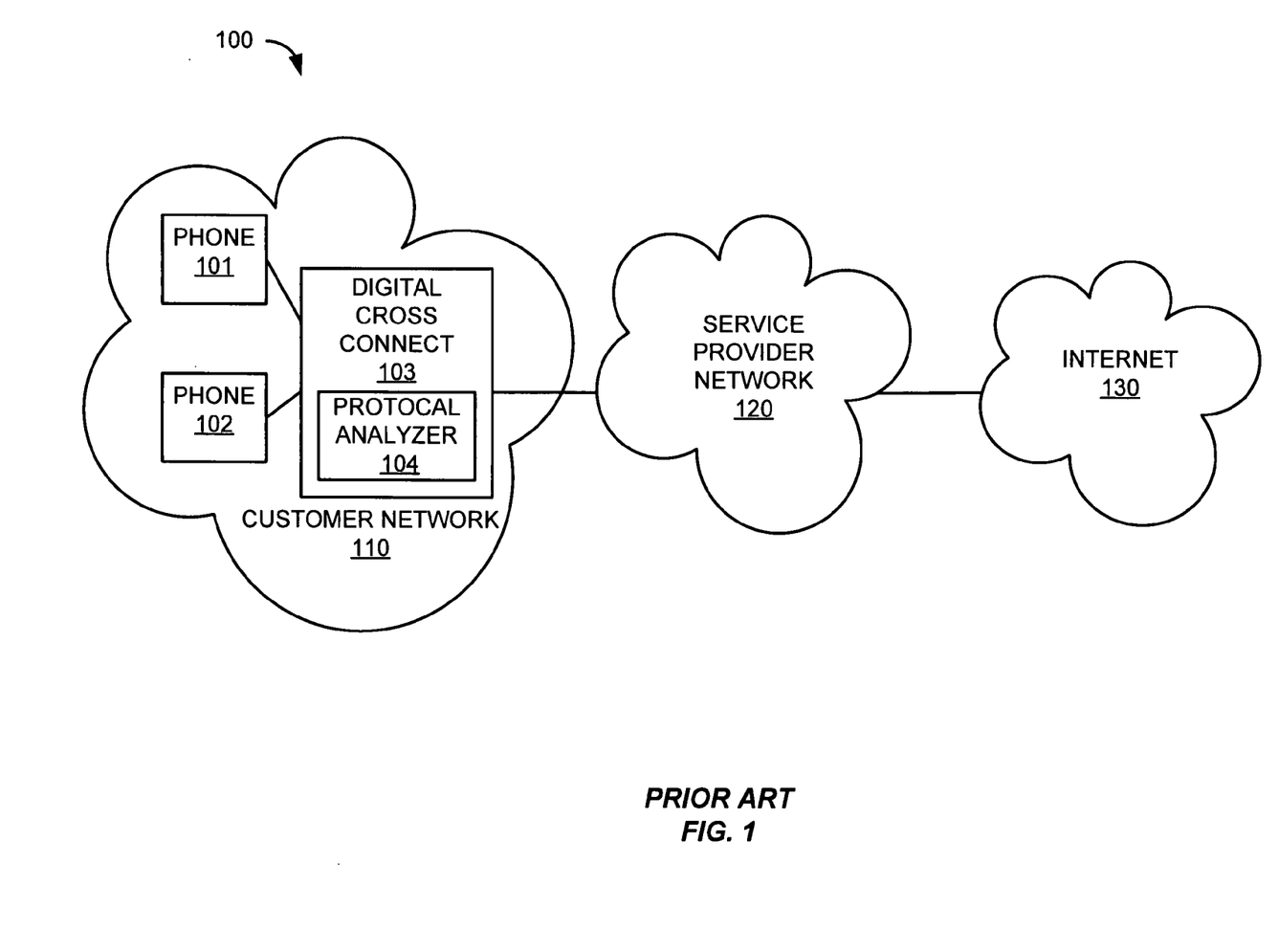
FIG. 1 illustrates a communication network in an example of the prior art.

FIG. 1 illustrates communication network 100 in an example of the prior art. Communication network 100 includes customer network 110, service provider network 120, and Internet 130. Customer network 110 includes VoIP enabled phones 101 and 102, and digital cross connect 103. Digital cross connect includes protocol analyzer 104. Service provider 120 includes router 121. Protocol analyzer 104 is an example of a local probe utilized to analyze whether or not elements of customer network 110 are operating correctly in accordance with communication protocols.

Service provider network 120 is an access network that provides access and service to elements of customer network 110. Digital cross connect 103 connects elements of customer network 110 to service provider network 121. Service provider network then provides access to Internet 130. In this example, service provider network 120 provides VoIP calling services to customer network 110. Callers place VoIP calls from phones 101 and 102. Digital cross connect 101 sends communications for the calls to service provider network 120. The calls are then routed over the Internet 130 to their respective destinations.

At times, users placing calls from phones 101 and 102 experience service problems. As illustrated by FIG. 1, a prior art solution is to place a local probe, protocol analyzer 104, on digital cross connect 103. Probe 104 can monitor the communications to and from phones 101 and 102. Additionally the probe can monitor the processes of digital cross connect 103. The cause of any service problems can be detected with the local probe.

This solution presents several problems for those concerned with network performance. For instance, a local probe is limited in the amount of data it can process. Furthermore, a local probe is unable to investigate packets on other networks other than the subject network. A local probe is also unable to correlate performance problems on other networks with problems on the subject network. In fact, local probes are often inaccessible from outside the network, thereby preventing outside monitoring capabilities and services, and are detectable by illegitimate sniffers and scanners.

Further problematically, if a probe is administered by a third party, such as a security firm or the service provider, the probe is often times inaccessible to the third party because it is located behind the customer's network firewalls and routers. Thus, the security firm, at best, is only able to periodically update the configuration of the probe. The local nature of probes in the prior art also prevents the probe from providing continual updates to the third party outside of the network. Third party security firms are prevented from fully analyzing the behavior of network elements. Instead, they are relegated to viewing sparse updates periodically transmitted from the local probes. Local probes also often times require inefficient and time consuming manual installation and operation.

SUMMARY OF THE INVENTION

An embodiment of the invention helps solve the above problems and other problems by providing a remote service testing system. The remote service testing system is able to monitor more than one network simultaneously. Additionally, the remote service testing system is able to have a local presence on a network while residing at a location remote from the network. Such a system provides a comprehensive view of the performance of elements within several networks. Such a system also provides a comprehensive view of the security threats faced by individual networks. Additionally, such a system is not limited to transmitting or receiving periodic performance or threat updates.

In an embodiment of the invention, a remote service testing system comprises a service analyzer within an access network, a first enterprise network having a first plurality of nodes, and a first network extension coupled to the first enterprise network and the service analyzer. The service analyzer accesses the first enterprise network over the first network extension and performs test functions on the first plurality of nodes.

In an embodiment of the invention, the service analyzer performs the test functions in response to a test request from the first enterprise network.

Another embodiment of the invention comprises a second enterprise network having a second plurality of nodes and further comprises a second network extension coupled to the second enterprise network and the service analyzer and wherein the service analyzer accesses the second enterprise network over the second network extension and performs test functions on the second plurality of nodes.

In an embodiment of the invention, the service analyzer performs the test functions in response to a test request from the second enterprise network.

In an embodiment of the invention, the first network extension comprises a General Framing Procedure (GFP) pipe.

In an embodiment of the invention, the first enterprise network comprises an Ethernet network.

In an embodiment of the invention, the first plurality of nodes comprise packet based voice communication devices.

In an embodiment of the invention, the service analyzer comprises a sniffer application.

In an embodiment of the invention, the test functions comprise protocol analysis.

In an embodiment of the invention, the test functions comprise intrusion detection.

BRIEF DESCRIPTION OF THE DRAWINGS

The same reference number represents the same element on all drawings.

DETAILED DESCRIPTION OF THE PREFERRED EMBODIMENT

FIGS. 2-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 2-3

Figure 2:
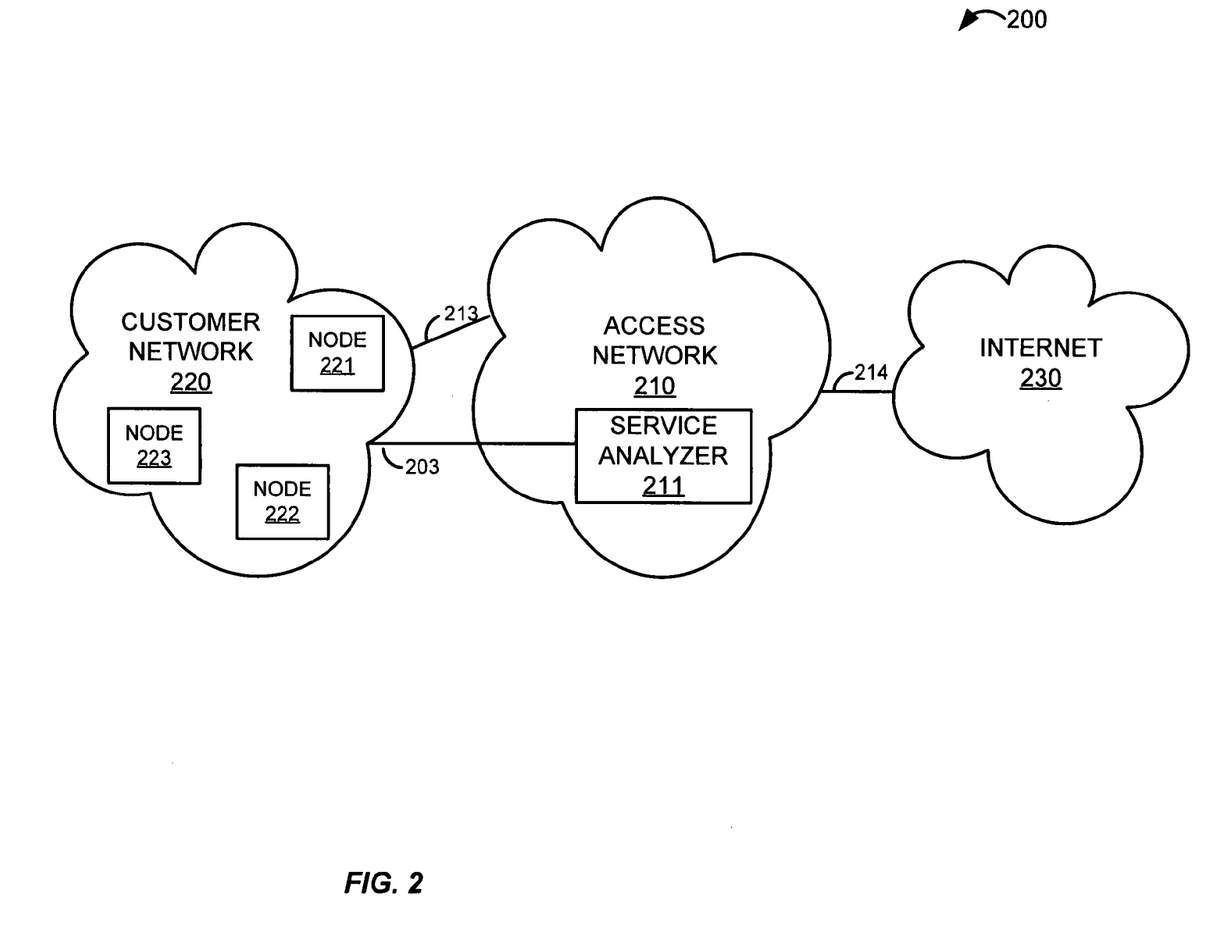
FIG. 2 illustrates a remote service testing system in an embodiment of the invention.

FIG. 2 illustrates remote service testing system 200 in an embodiment of the invention. Remote service testing system 200 includes access network 210 coupled to Internet 230 over link 214. Remote service testing system 200 also includes access network 210 coupled to customer network 220 over link 213. Links 213 and 214 are standard links well known in the art. Access network 210 includes service analyzer 211. Customer network 220 includes nodes 221, 222, and 223. Service analyzer 211 is coupled to customer network 203 over network extension 203. Access network 210 provides services for customer network 220 to access Internet 230. Nodes 221, 222, and 223 comprise nodes capable of accessing Internet 230 over the services provided by access network 210. Service analyzer accesses customer network 220 over network extension 203 and performs test functions on nodes 221, 222, and 223.

In an embodiment of the invention, access network 210 provides packet voice access service to customer network 220. Nodes 221, 222, and 223 could be packet voice service enabled. Customer network 220 could be an enterprise network such as a corporate local area network (LAN), a university, as well as other types of enterprise. Customer network 220 could also be a service provider such as a cable operator, a digital subscriber line (DSL) operator, a wireless communications carrier, as well as other types of customers.

Customer network 220 provides services, such as packet voice service, to nodes 221, 222, and 223. Nodes 221, 222, and 223 could be communication elements such as mobile phones, personal digital assistants (PDAs), personal computers, laptop computers, and pagers, as well as other communication elements. Access network 210 could be operated by an operational entity, such as a telecommunication operator, a cable operator, as well as other entities well known in the art. The operator of customer network 220 could be a customer of the operator of access network 210.

When users use nodes 221, 222, and 223 for packet voice services, voice packets are sent and received between customer network 220 and access network 210. The voice packets are further sent and received between access network 210 and Internet 230. From Internet 230, the voice packets eventually reach a destination, such as another packet voice enabled communication device. Alternatively, users could use nodes 221, 222, and 223 for data services, such as web browsing, e-mail, and short mail, as well as other data services.

In this example, nodes 221, 222, and 223 should operate in accordance with certain protocols. Additionally, customer network 220 should operate in accordance with certain protocols. Some protocols include Session Initiation Protocol (SIP), VoIP, H.323, TCP/IP, as well as other protocols. However, there are often times errors in the operation of customer network 220 and the operation of nodes 221, 222, and 223. As discussed above in the background, a prior art solution for testing operations involved placing a local probe on a digital cross connect (not shown) in customer network 220. Unfortunately, there are several drawbacks to that approach. In this embodiment, service analyzer 211 remotely tests the performance of nodes 221, 222, and 223 over network extension 203.

Figure 3:
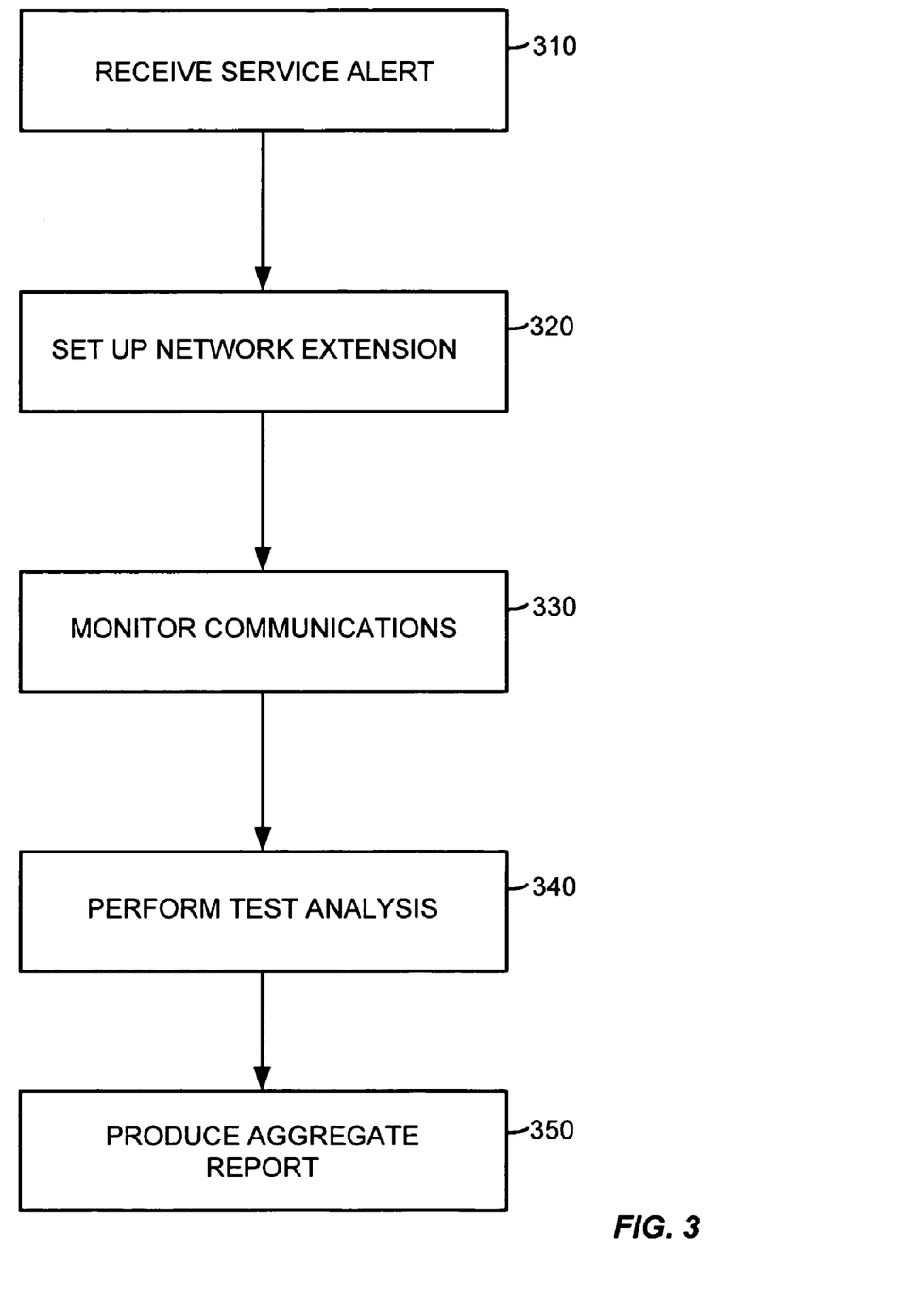
FIG. 3 illustrates the operation of a remote service testing system in an embodiment of the invention.

FIG. 3 illustrates the operation of remote service testing system 200 in an embodiment of the invention. To begin, service analyzer 211 receives a service alert from customer network 220 (Step 310). The service alert indicates that a problem exists with the packet voice service. A network extension 203 is setup between service analyzer 211 and customer network 220 (Step 320). Service analyzer 211 monitors packet voice communications on customer network 220 (Step 330). Next, service analyzer 211 performs testing and analysis on the communications to determine the cause of the service alert (Step 340). A cause could be, for example, that one or more of nodes 221, 222, and 223 are not operating correctly in accordance with a particular protocol. A cause could also be, for example, that network equipment in customer network 220, such as a digital cross connect, is not operating correctly. An aggregate report is produced detailing the cause of the service alert (Step 350), and action is taken to remedy any problems in customer network 220.

Advantageously, the remote service testing system is able to monitor more than one network simultaneously. Additionally, the remote service testing system is able to have a local presence on a network while residing at a location remote from the network. Such a system provides a comprehensive view of the performance of elements within several networks. Such a system also provides a comprehensive view of the security threats faced by individual networks. Additionally, such a system is not limited to transmitting or receiving periodic performance or threat updates. Further advantageously, the network extension can be setup automatically rather than requiring the manual installation of a local probe.

Second Embodiment Configuration and Operation

FIGS. 4-5

Figure 4:
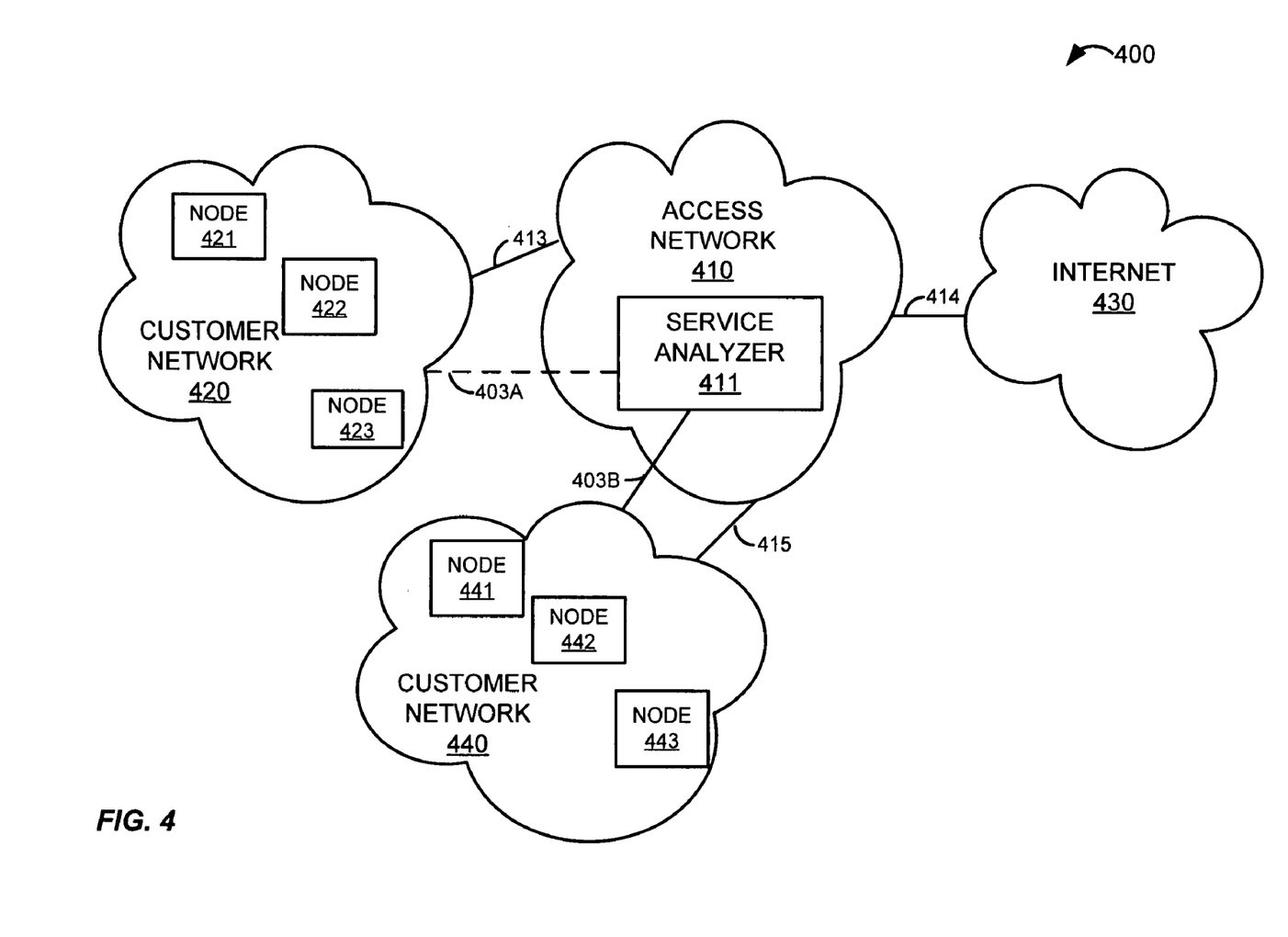
FIG. 4 illustrates a remote service testing system in an embodiment of the invention.

FIG. 4 illustrates remote service testing system 400 in an embodiment of the invention. Remote service testing system 400 includes access network 410, customer network 420, Internet 430, and customer network 440. Access network 410 includes service analyzer 411. Customer network 420 includes nodes 421, 422, and 423. Customer network 440 includes nodes 441, 442, and 443. Access network 410 is coupled to customer network 420 by link 413 as is well known in the art. Access network 410 is coupled to customer network 440 as is well known in the art. Access network 410 is coupled to Internet 430 as is well known in the art. Network extension 403A links service analyzer 411 and customer network 420. Network extension 403B links service analyzer 411 and customer network 440.

Network extensions 403A and 403B could be General Framing Procedure (GFP) pipes. GFP maps Ethernet to time division multiplexed (TDM) transports. Customer networks 420 and 440 could be Ethernet networks. In an embodiment of the invention, access network 410 provides packet voice access service to customer networks 420 and 440. Nodes 421, 422, 423, 441, 442, and 442 could be packet voice service enabled. Customer networks 420 and 440 could be enterprise networks such as a corporate local area network (LAN), a university, as well as other types of enterprises. Customer networks 420 and 440 could also be service providers such as cable operators, digital subscriber line (DSL) operators, wireless communications carriers, as well as other types of customers.

Customer networks 420 and 440 provide services, such as packet and data voice services, to nodes 421, 422, 423, 441, 442, and 442. Nodes 421, 422, 423, 441, 442, and 442 could be communication elements such as mobile phones, personal digital assistants (PDAs), personal computers, laptop computers, and pagers, as well as other communication elements. Access network 410 could be operated by an operational entity, such as a telecommunication operator, a cable operator, as well as other entities well known in the art. The operator or operators of customer networks 420 and 440 could be customers of the operator of access network 410. Alternatively, the operator or operators of customer networks 420 and 440 could be considered an entity other than a customer. For example, they could be considered partners with the operator of access network 410.

When users use nodes 421, 422, 423, 441, 442, and 443 for packet voice services, voice packets are sent and received between customer networks 420, 440 and access network 410. The voice packets are further sent and received between access network 410 and Internet 430. From Internet 430, the voice packets eventually reach a destination, such as another packet voice enabled communication device. Similarly, users could use nodes 421, 422, 423, 441, 442, and 443 for data services.

In this example, nodes 421, 422, 423, 441, 442, and 443 should operate in accordance with certain protocols. Additionally, customer networks 420, 440 should operate in accordance with certain protocols, such as SIP, VoIP, and TCP/IP, as well as other protocols. However, there are often times errors in the operation of customer networks 420, 440 and the operation of nodes 421, 422, 423, 441, 442, and 443. As discussed above in the background, a prior art solution for testing operations involved placing a local probe on a digital cross connect (not shown) in customer networks 420, 440. Unfortunately, there are several drawbacks to that approach.

In this embodiment, service analyzer 411 remotely tests the performance of nodes 421, 422, 423, 441, 442, and 443 over network extensions 403A and 403B.

In operation, service analyzer 411 accesses the first customer network 420 over the first network extension 403A and performs test functions on the nodes 421, 422, 423 of customer network 420. In one embodiment, service analyzer 411 performs the test functions in response to a test request from customer network 420. In another embodiment, service analyzer 411 accesses the second customer network 440 over the second network extension 403B and performs test functions on the nodes 441, 442, 443 of customer network 440.

Network extensions 403A and 403B can be setup and taken down dynamically. Thus, network extension 403A is illustrated with a dotted line, whereas network extension 403B is illustrated with a solid line. This illustrates that network extension 403A had been previously setup and then taken down, and that network extension 403B has been setup and is currently under testing. Service analyzer 411 could perform the test functions in response to a test request from the second customer network 440. The test functions could comprise protocol analysis and intrusion detection. Service analyzer 411 could comprise a sniffer application.

Figure 5:
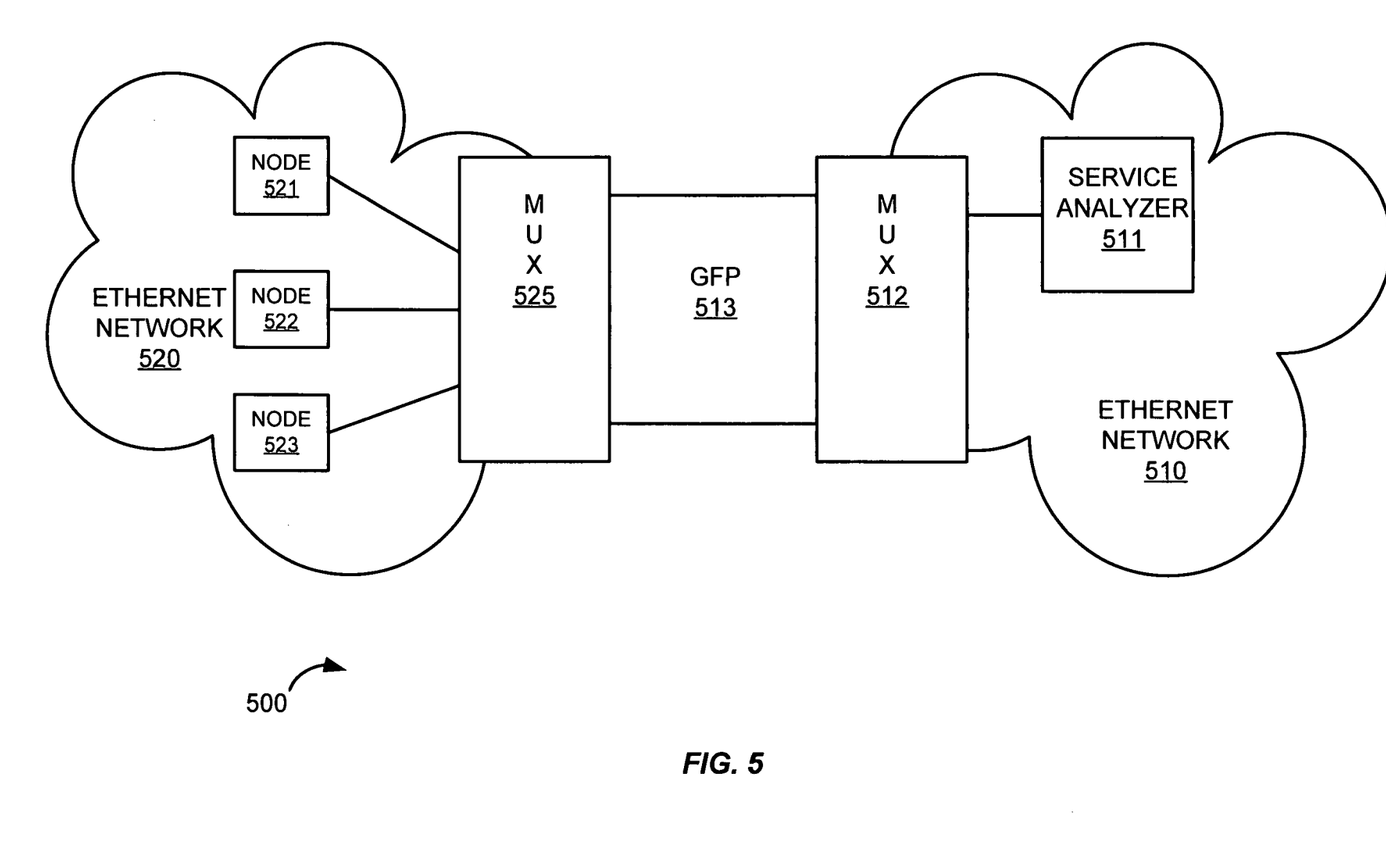
FIG. 5 illustrates a remote service testing system in an embodiment of the invention.

FIG. 5 illustrates remote service testing system 500 in an embodiment of the invention. Remote service testing system 500 includes Ethernet network 510, Ethernet network 520, and GFP pipe 513. Ethernet network 510 includes service analyzer 511 and multiplexer (MUX) 512. Ethernet network 520 includes nodes 521, 522, and 523, and multiplexer (MUX) 525. MUX 512 is coupled to MUX 525 by GFP pipe 513. MUX 512 maps communications between packet and TDM formats. Similarly, MUX 525 maps communications between packet and TDM formats.

GFP pipe 513 provides an access point to Ethernet network 520 for service analyzer 511 in Ethernet network 510. Enablement of Ethernet transport over GFP enables remote Ethernet ports on Ethernet network 520 to be survailed, and end to end flow and loop back testing. Service analyzer 511 can include a protocol analyzer or a local sniffer to enable remote trouble shooting and intrusion detection without encountering problems associated with crossing routers or bridges. Individual elements, such as nodes 521, 522, and 523, can be isolated and their real time behavior investigated.

Advantageously, service analyzer 511 is located at the point where mapping between packet and TDM occurs. MUX 512 could be a digital cross connect modified to have an Ethernet test access port. Similarly, MUX 513 could be a digital cross connect modified to have an Ethernet test access port. Remote service testing system 500 provides GFP to transport Ethernet connectivity to the ends of an Ethernet circuit to perform end to end testing. If the circuit is in a GFP transport device, the circuit can be re-routed to an access point and tested remotely from a centrally located sniffer, such as service analyzer 511. The test system, such as service analyzer 511, can also be plugged into the GFP transport into customer hubs, routers, or switches to accomplish testing.

GFP is protocol for mapping packet data on to a TDM transport, such as SONET. GFP does not use any special characters for frame delineation. Instead, it has adapted the cell delineation protocol used by ATM (Asynchronous Transfer Mode) to encapsulate variable length packets. A fixed amount of overhead is required by the GFP encapsulation that is independent of the contents of the packets. The fixed amount of overhead per packet allows deterministic matching of bandwidth between the Ethernet stream and a virtually concatenated SONET stream.

The GFP overhead can consist of up to 3 headers: 1) a Core header containing the packet length and a CRC which is used for packet delineation; 2) a Type header identifying the payload type; and 3) an Extension header, which is optional. Frame delineation is performed on the core header. The core header contains the two byte packet length and a CRC. The receiver would hunt for a correct CRC and then use the received packet length to predict the location of the start of the next packet.

Within GFP, there are two different mapping modes defined: frame based mapping and transparent mapping. Each mode is optimized for providing different services. Frame based GFP is used for connections where efficiency and flexibility are key. In order to support the frame delineation mode utilized within GFP, the frame length must be known and prepended to the head of the packet. In many protocols, this forces a store-and-forward encapsulation architecture in order to buffer the entire frame and determine its length. This buffering may add undesirable latency. Frame based GFP is good for sub-rate services and statistically multiplexed services as the entire overhead associated with the line coding and interpacket gap (IPG) are discarded and not transported.

Transparent GFP is useful for applications that are sensitive to latency or for unknown physical layers. In this encapsulation, all code words from the physical interface are transmitted. Currently, only physical layers that use 8B/10B encoding are supported. In order to increase efficiency, the 8B/10B line code are transcoded into a 64B/65B block code and then the block codes are encapsulated into fixed sized GFP packets. This coding method is primarily targeted at networks where latency is very important and the delays associated with frame based GFP cannot be tolerated.

An Ethernet based network extension service could be carried through currently deployed SONET networks using the GFP encapsulation and virtual concatenation technologies. Such an extension may be provisioned at various service rates from 50 Mbit/s to 1 Gbit/s utilizing STS-1 concatenation and from 1.6 Mbit/s to 100 Mbit/s utilizing VT1.5 concatenation. Ethernet private lines deployed over SONET offer the reliability and broad service area coverage associated with the carrier infrastructure. As it is a private line, data rate guarantees and security are key offerings, as well as upgradable bandwidth utilizing the LCAS protocol to adjust the bandwidth supplied.

Figure 6:
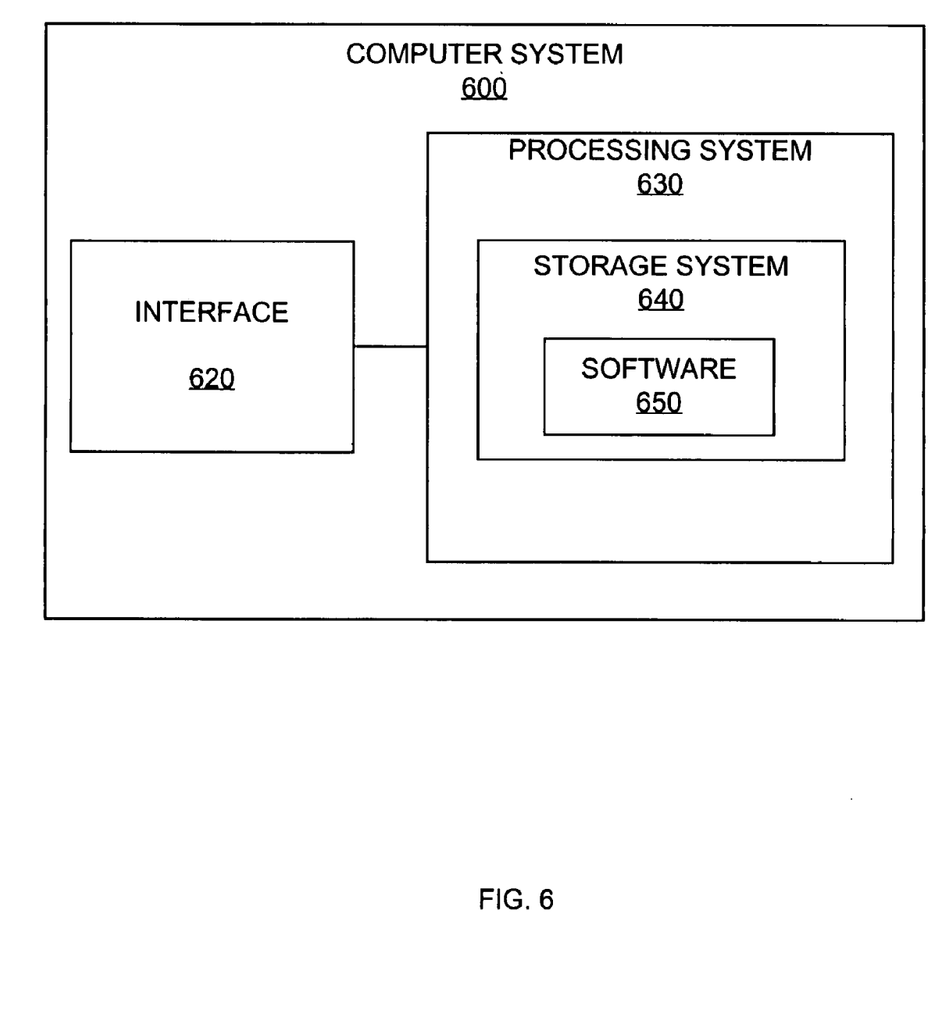
FIG. 6 illustrates a computer system in an embodiment of the invention.

FIG. 6 illustrates computer system 600 in an embodiment of the invention. Computer system 600 includes interface 620, processing system 630, storage system 640, and software 650. Storage system 640 stores software 650. Processing system 630 is linked to interface 620. Computer system 600 could be comprised of a programmed general-purpose computer, although those skilled in the art will appreciate that programmable or special purpose circuitry and equipment may be used. Computer system 600 may use a client server architecture where operations are distributed among a server system and client devices that together comprise elements 620-650.

Interface 620 could comprise a network interface card, modem, port, or some other communication device. Signaling interface 620 may be distributed among multiple communication devices. Interface 630 could comprise a computer microprocessor, logic circuit, or some other processing device. Processing system 630 may be distributed among multiple processing devices. Storage system 640 could comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a general-purpose computer. Software 650 could also comprise an application program, firmware, or some other form of machine-readable processing instructions. When executed by the processing system 630, software 650 directs processing system 630 to operate as described for remote service testing systems 200, 400, and 500. Also when executed by the processing system 630, software 650 directs processing system 630 to operate as described for service analyzers 211, 411, and 511.

What is claimed is:

1. A remote service testing system comprising:
a first plurality of nodes configured to transmit first communications in an Ethernet format;
a first multiplexing system coupled to the first plurality of nodes and configured to receive the first communications in the Ethernet format and transfer the first communications in the Ethernet format over a first plurality of time division multiplexed (TDM) circuits in a first network extension;
a second multiplexing system coupled to the first multiplexing system by the first network extension and configured to receive the first communications in the Ethernet format over the first plurality of TDM circuits and transfer the first communications in the Ethernet format to an Internet; and
a service analyzer coupled to the second multiplexing system and configured to instruct the second multiplexing system to re-route a one of the first plurality of TDM circuits to the service analyzer and perform test functions on re-routed first communications associated with the one of the first plurality of TDM circuits;
a second plurality of nodes configured to transmit second communications in an Ethernet format;
a third multiplexing system coupled to the second plurality of nodes and configured to receive the second communications in the Ethernet format over a second plurality of TDM circuits in a second network extension;
the second multiplexing system coupled to the third multiplexing system by the second network extension and configured to receive the second communications in the Ethernet format over the second plurality of TDM circuits and transfer the second communications in the Ethernet format to the Internet; and
the service analyzer configured to instruct the second multiplexing system to re-route a one of the second plurality of TDM circuits to the service analyzer and perform test functions on re-routed second communications associated with the one of the second plurality of TDM circuits.

2. The system of claim 1 wherein the first and second network extensions comprise General Framing Procedure (GFP) pipes.

3. The system of claim 1 wherein the first and second plurality of nodes comprise packet based voice communication devices.

4. The system of claim 1 wherein the service analyzer comprises a sniffer application.

5. The system of claim 1 wherein the test functions comprise protocol analysis.

6. The system of claim 1 wherein the test functions comprise intrusion detection.

7. A method of operating a remote service testing system, the method comprising:

in a first multiplexing system coupled to a first plurality of nodes, receiving first communications in an Ethernet format from the first plurality of nodes and transferring the first communications in the Ethernet format over a first plurality of time division multiplexed (TDM) circuits in a first network extension;

in a second multiplexing system coupled to the first multiplexing system by the first network extension, receiving the first communications in the Ethernet format over the first plurality of TDM circuits and transferring the first communications in the Ethernet format to an Internet; and in a service analyzer coupled to the second multiplexing system, instructing the second multiplexing system to re-route a one of the first plurality of TDM circuits to the service analyzer and performing test functions on re-routed first communications associated with the one of the first plurality of TDM circuits;

in a third multiplexing system coupled to a second plurality of nodes, receiving second communications in a Ethernet format and transferring the second communications in the Ethernet format over a second plurality of TDM circuits in a second network extension;

in the second multiplexing system coupled to the third multiplexing system by the second network extension, receiving the second communications in the Ethernet format over the second plurality of TDM circuits and transferring the second communications in the Ethernet format to the Internet; and in the service analyzer, instructing the second multiplexing system to re-route a one of the second plurality of TDM circuits to the service analyzer and performing test functions on re-routed second communications associated with the one of the second plurality of TDM circuits.

8. The method of claim 7 wherein the first and second network extensions comprise General Framing Procedure (GFP) pipes.

9. The method of claim 7 wherein the first and second plurality of nodes comprise packet based voice communication devices.

10. The method of claim 7 wherein the service analyzer comprises a sniffer application.

11. The method of claim 7 wherein the test functions comprise protocol analysis.

12. The method of claim 7 wherein the test functions comprise intrusion detection.

* * * * *

UNITED STATES PATENT AND TRADEMARK OFFICE
CERTIFICATE OF CORRECTION

| | | |
|---|---|---|
| PATENT NO. | : 7,646,720 B1 | Page 1 of 1 |
| APPLICATION NO. | : 10/959546 | |
| DATED | : January 12, 2010 | |
| INVENTOR(S) | : Michael K. Bugenhagen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1345 days.

Signed and Sealed this

Sixteenth Day of November, 2010

David J. Kappos
*Director of the United States Patent and Trademark Office*